United States Patent [19]

Nagatoshi et al.

[11] 4,078,017

[45] Mar. 7, 1978

[54] PROCESS FOR PRODUCTION OF MODIFIED POLYPROPYLENE

[75] Inventors: Kikuo Nagatoshi, Kisarazu; Toshimichi Ito, Sodegaura; Atsunobu Sakoda, Sodegaura; Akio Inayoshi, Sodegaura; Noriki Fujimoto, Sodegaura; Hidehiko Kaji, Sodegaura; Hirozo Sugahara, Sodegaura, all of Japan

[73] Assignee: Idemitsu Kosan Company, Ltd., Tokyo, Japan

[21] Appl. No.: 774,202

[22] Filed: Mar. 3, 1977

[30] Foreign Application Priority Data

Mar. 4, 1976    Japan .................................. 51-22626

[51] Int. Cl.$^2$ ........................................... C08F 255/02

[52] U.S. Cl. .................................................. 260/878 R
[58] Field of Search .................................... 260/878 R

[56] References Cited

U.S. PATENT DOCUMENTS

| 3,131,990 | 5/1964 | Bonvicini et al. ............... 260/878 R |
| 3,862,266 | 1/1975 | McConnell et al. ............. 260/878 R |
| 3,928,687 | 12/1975 | Wada et al. ..................... 260/878 R |
| 4,000,111 | 12/1976 | Henman et al. ................. 260/878 R |

*Primary Examiner*—Alan Holler
*Attorney, Agent, or Firm*—Flynn & Frishauf

[57] ABSTRACT

A process for producing modified polypropylene comprising reacting polypropylene with a liquid rubber and maleic anhydride in a solvent in the presence of a radical generator.

6 Claims, No Drawings

PROCESS FOR PRODUCTION OF MODIFIED POLYPROPYLENE

FIELD OF THE INVENTION

The present invention relates to a process for production of modified polypropylenes. More particularly, the present invention is concerned with a process for producing modified polypropylenes by reacting a polypropylene with a liquid rubber and maleic anhydride in a solvent in the presence of a radical generator.

BACKGROUND OF THE INVENTION

In general, non-polar plastics such as polyethylene, polypropylene and the like have poor dyeability, ink receptivity, plating and coating properties and adhesion characteristics.

In order to improve these properties of the plastics, incorporation of inorganic fillers in the plastics, physical or chemical treatments or plastic articles, e.g., surface treatments such as chemical etching using acid, corona discharge treatment, flame treatment, plasma jet treatment, etc., surface-coarsening using sandpaper, etc., application of primers, etc., have heretofore been conducted.

These techniques, however, have disadvantages in that expensive apparatus and complicated operations are needed, the plastic articles to be treated are limited in their shapes and sizes, care must be taken in handling the already molded plastic articles and it is difficult to effect a uniform treatment.

On the other hand, a method of introducing polar groups into a polypropylene resin by reacting it with maleic anhydride, for example, to improve the adhesion characteristics and dyeability thereof is described in Japanese Patent Publications Nos. 27421/1968 and 15422/1969. This method, however, has failed to sufficiently achieve the expected results since it is difficult to introduce a large amount of the polar groups.

SUMMARY OF THE INVENTION

An object of the present invention is to provide a process for production of modified polypropylene removing the above-described defects of the prior art non-polar plastics.

It has now been found that the above modified polypropylene can be obtained by reacting polypropylene with a liquid rubber and maleic anhydride; that is, a modified polypropylene containing an effective amount of polar groups can be obtained by reacting a polypropylene with a liquid rubber and maleic anhydride.

Thus, the present invention provides a process for producing modified polypropylene comprising reacting a polypropylene with a liquid rubber and maleic anhydride in a solvent in the presence of a radical generator.

DETAILED DESCRIPTION OF THE INVENTION

There is no limitation on the polypropylenes used in the method of the present invention, and stereospecific polypropylene, atactic polypropylene produced as a by-product in stereospecific polymerization, and in addition, those polypropylenes obtained by copolymerizing propylene with a small amount of another olefin, which are generally called polypropylene resins, can be used.

The term "liquid rubber" as herein used designates polymers composed mainly of diene monomers and having a number average molecular weight of 500 to 10,000. Preferred polymers are those showing fluidity at room temperature.

Suitable examples of these liquid rubbers are liquid rubbers such as poly-1,2-butadiene, poly-1,4-butadiene, polyisoprene, polychloroprene, styrene-butadiene copolymers, acrylonitrile-butadiene copolymers, butadiene-isoprene copolymers and butadiene-pentadiene copolymers, each containing a functional group such as carboxyl, hydroxyl, mercapto, halogen, amino, aziridino, epoxy and the like; unsaturated dicarboxylic acid half-esters of poly-1,2-butadiene or poly-1,4-butadiene and the like, each being hydroxylated at the terminal carbon; poly-1,2-butadiene, poly-1,4butadiene, styrene-butadiene copolymers, acrylonitrile-butadiene copolymers and the like, each containing no functional groups and having a number average molecular weight of 500 to 10,000; heatdecomposed rubber, ozone-decomposed rubber and the like; and mixtures thereof.

The liquid rubber is preferably used in an amount of from 1 to 20 parts by weight per 100 parts by weight of the above polypropylene. Where the amount of the liquid rubber added is less than 1 part by weight, only a small effect is obtained, whereas in the case of more than 20 parts by weight, gelation of the liquid rubber is undesirably predominant. The liquid rubber contributes to introduce a large amount of maleic anhydride from the standpoint of elementary reaction, and it also acts to improve the physical properties such as strength, ink receptivity, coating and plating properties, etc., of the modified polypropylene.

Maleic anhydride is generally used in an amount of from 5 to 50 parts by weight per 100 parts by weight of the polypropylene. Where the amount of the maleic anhydride used is less than 5 parts by weight per 100 parts by weight of the polypropylene, the dyeability, adhesion characteristics, coating and plating properties and ink receptivity of articles produced are improved insufficiently, whereas the addition of more than 50 parts by weight of the maleic anhydride is meaningless as no effect corresponding to the amount is obtained.

Any radical generator can be used provided that it accelerates the reaction of polypropylene with liquid rubber and maleic anhydride. Suitable examples of these radical generators are benzoyl peroxide, lauroyl peroxide, azobisisobutyronitrile, dicumyl peroxide, α,α'-bis(t-butylperoxydiisopropyl)benzene, 2,5-dimethyl-2,5-di(t-butylperoxy)hexane, di-t-butyl peroxide, cumene hydroperoxide, t-butyl hydroperoxide and the like.

From these radical generators, a suitable one is selected depending upon the solvent to be used. It is effective to use the radical generator in an amount of from 0.5 to 10 parts by weight per 100 parts by weight of the polypropylene. The addition of more than 10 parts by weight of the radical generator gives no greater effect.

As solvents used in reacting the above polypropylene, liquid rubber, maleic anhydride and radical generator, any solvent can be used provided that it is able to act to swell or dissolve the polypropylene. For example, hydrocarbons such as xylene, toluene, tetralin, decalin, heptane and the like, or halogenated hydrocarbons such as monochlorobenzene, dichlorobenzene and the like can be used. Among these solvents, xylene is most suitably used. The amount of the solvent employed can be varied within wide limits provided that the effect of solvent is attained. It is preferred, however, taking into account economy and convenience of operation, that the amount be in the range of from 500 to 1,000 parts by weight per 100 parts by weight of the polypropylene.

The reaction temperature and time will vary depending upon the kind of radical generator and solvent used, and the concentrations of starting materials. The reaction temperature is generally from 50° to 150° C., and the reaction time is suitably from 2 to 5 hours. The most suitable conditions for a reaction system wherein an isotactic polypropylene is a starting material, dicumyl peroxide is a radical generator and xylene is a solvent are from 120 to 140° C. and from 3 to 4 hours.

Isolation of the modified polypropylene obtained can be carried out by usual methods; for instance, the modified polypropylene obtained is cooled, precipitated in a poor solvent such as acetone, filtered with suction and dried in vacuo.

The method of the present invention, in which the reaction is carried out in the presence of liquid rubber, makes it possible to produce a modified polypropylene with a larger amount of maleic anhydride introduced therein in comparison with conventional ones. The modified polypropylene obtained is superior in physical properties to conventional polypropylene resins, and furthermore, it has excellent dyeability, and excellent fabricating characteristics such as adhesion characteristics to various kinds of materials, ink receptivity, coating and plating properties, etc. Thus, the modified polypropylene of the present invention can be used effectively in producing fiber or plastic molds, particularly molds suitable for coating and plating, and furthermore, it can be used widely in many industrial applications, e.g., blending material for modifying other plastics, coating of inorganic materials, etc.

The present invention is described in greater detail in the following examples and comparative examples.

EXAMPLE 1

A mixture of 100 parts by weight of a polypropylene containing copolymers of propylene and a small amount of ethylene (melt index: 9 grams/10 minutes; density: 0.91 g/cm$^3$), 5 parts by weight of a terminal-hydroxylated poly-1,2-butadiene (number average molecular weight: 2000; density: 0.99 g/cm$^3$; flow point: 17° C.), 20 parts by weight of maleic anhydride, 1.72 parts by weight of dicumyl peroxide, and 600 parts by weight of xylene was placed in a 1 liter, three-necked separable flask equipped with a stirrer and a reflux apparatus, heated on an oil bath by the use of an immersion heater, reacted with stirring at 120° C. for 1 hour, and further reacted at 140° C. for 3 hours. After the reaction was completed, the reaction mass was cooled and precipitated in a great excess of acetone. The resulting precipitate was filtered with suction and dried further at 70° C. for 50 hours, whereby a white, powdery polymer was obtained.

The dried product so obtained was placed in a Soxhlet extraction apparatus and extracted with acetone for 16 hours to remove therefrom the unreacted polybutadiene and maleic anhydride. Thereafter, the amount of maleic anhydride added per the total weight of the polymer produced was calculated. As a result, the acid value was 55.8; that is, the amount of maleic anhydride added was 4.9 percent by weight.

EXAMPLE 2

The procedure of Example 1 was repeated with the exception that the amount of terminal-hydroxylated poly-1,2-butadiene was changed from 5 parts by weight to 20 parts by weight.

With the polymer so obtained, the acid value was 89.1; that is, the amount of maleic anhydride added was 7.8 percent by weight.

EXAMPLE 3

The procedure of Example 1 was repeated with the exception that the amount of maleic anhydride was changed from 20 parts by weight to 40 parts by weight.

With the polymer so obtained, the acid value was 67.1; that is, the amount of maleic anhydride added was 5.9 percent by weight.

COMPARATIVE EXAMPLE 1

The procedure of Example 1 was repeated with the exception that the terminal-hydroxylated poly-1,2-butadiene was not added, and that the amount of xylene was changed from 600 parts by weight to 800 parts by weight.

With the polymer so obtained, the acid value was 5.7; that is, the amount of maleic anhydride added was only 0.5 percent by weight.

EXAMPLE 4

The procedure of Example 1 was repeated with the exception that the amount of dicumyl peroxide was changed from 1.72 parts by weight to 3.45 parts by weight.

With the polymer so obtained, the acid value was 58.7; that is, the amount of maleic anhydride added was 5.1 percent by weight.

COMPARATIVE EXAMPLE 2

The procedure of Example 4 was repeated with the exception that the terminal-hydroxylated poly-1,2-butadiene was not added, and that the amount of xylene was changed from 600 parts to 800 parts by weight.

With the polymer so obtained, the acid value was 4.9; that is, the amount of maleic anhydride added was only 0.4 percent by weight.

EXAMPLE 5

In the same apparatus as used in Example 1, 100 parts by weight of a polypropylene containing copolymers of propylene and a small amount of ethylene (melt index: 9 grams/10 minutes; density 0.91 g/cm$^3$), 5 parts by weight of terminal hydroxylated poly-1,4-butadiene (number average molecular weight: 3,000; viscosity: 50 poise (at 30° C.); OH group content: 0.83 meq/g.), 20 parts by weight of maleic anhydride, 1.72 parts by weight of dicumyl peroxide, and 600 parts by weight of xylene were placed, and thereafter the same procedure as used in Example 1 was conducted.

With the polymer so obtained, the acid value was 59.1; that is, the amount of maleic anhydride added was 5.2 percent by weight.

EXAMPLE 6

In the same apparatus as used in Example 1, 100 parts by weight of propylene homopolymer (melt index: 9 grams/10 minutes; density: 0.91 g/cm$^3$), 5 parts by weight of terminalcarboxylated poly-1,2-butadiene (number average molecular weight: 2,000; density: 0.89 g/cm$^3$; flow point: 20° C.), 20 parts by weight of maleic anhydride, 2.15 parts by weight of $\alpha$, $\alpha'$-bis(t-butyl peroxydiisopropyl)benzene, and 600 parts by weight of xylene were placed, and thereafter the same procedure as used in Example 1 was conducted.

With the polymer so obtained, the acid value was 53.7; that is, the amount of maleic anhydride added was 4.7 percent by weight.

EXAMPLE 7

In the same apparatus as used in Example 1, 100 parts by weight of a polypropylene containing copolymers of propylene and a small amount of ethylene (melt index: 9 grams/10 minutes; density: 0.91 g/cm$^3$), 10 parts by weight of terminal-hydroxylated poly-1,4-butadiene (number average molecular weight: 3,000; viscosity: 50 poise (at 30° C.); OH group content: 0.83 meq./g.), 20 parts by weight of maleic anhydride, 1.72 parts by weight of dicumyl peroxide, and 600 parts by weight of xylene were placed, heated on an oil bath by the use of an immersion heater, reacted with stirring at 120° C. for 1 hour, and further reacted at 140° C. for 3 hours. After the reaction was completed, the reaction mass was cooled and precipitated in a great excess of acetone. The resulting precipitate was filtered with suction and dried further at 70° C. for 50 hours, whereby a white, powdery polymer was obtained.

The dried product so obtained was placed in a Soxhlet extraction apparatus and extracted with acetone for 16 hours to remove therefrom the unreacted polybutadiene and maleic anhydride. Thereafter, the amount of maleic anhydride added per the total weight of the polymer produced was calculated. As a result, the acid value was 66.2; that is, the amount of maleic anhydride added was 5.8 percent by weight.

The modified polypropylene so obtained was fed to a vertical type injection molding machine (mold clamping force: 16 tons) and made into a plate (3 millimeters of thickness, 75 millimeters in length, 31 millimeters in width) under the following molding conditions: temperature of cylinder (200° C.), injection pressure (50 kg/cm$^2$) and temperature of mold (room temperature).

Plating on this plate was done with the following process.

The plate was pretreated by degreasing and was immersed into a chemical etching solution (70° ± 5° C.) prepared by adding potassium dichromate (15 grams per liter of aqueous solution) to an aqueous solution of 60 percent (by volume) of sulfuric acid, 10 percent (by volume) of phosphoric acid and 30 percent (by volume) of water for 15 minutes. Then, the plate was dipped into a solution of tin dichloride at a room temperature for 5 minutes in order to provide induction property, followed by an activating treatment of immersing the plate into a solution of palladium chloride at room temperature for 2 minutes.

After applying a chemical nickel plating, the plate was electroplated with a semi-bright nickel plating, bright nickel plating and chromium plating in this order.

Electroplating thickness of the product so obtained was less than about 25μ. Evaluation of the plating on the product was done by judgment of its appearance visually; scotch peeling test; bending test and boiling test. The boiling test was made by observing the change of the surface of the product after applying 4 cycles of treatment of dipping the product into boiling water for 2 hours and dipping the product into ice water (0° C.) for 20 minutes. The result is shown in Table 1.

Table 1

| Appearance | satisfactory |
|---|---|
| Scotch peeling* | 100/100 |
| Bending Test | not peeled |
| Boiling Test | not changed |

*The test methods used in the examples and comparative examples are as follows: a cellophane tape (produced by Nichiban Co., Ltd.) was stuck to a coating layer and peeled off rapidly in the 45° direction, which was repeated twice. Scotch peeling: The coating layer was scratched with the edge of a blade to such an extent that it reached to the surface of the underlying article, to produce 100 of 1 millimeter × 1 millimeter squares thereon. The above tape was stuck on the coating layer and peeled off. The mark A of A/100 indicates the number of remaining squares.

What is claimed is:

1. A process for producing a modified polypropylene which comprises reacting a polypropylene with a liquid rubber and maleic anhydride in a solvent in the presence of a radical generator.

2. Process according to claim 1, wherein 100 parts by weight of polypropylene are reacted with from 1 to 20 parts by weight of liquid rubber and from 5 to 50 parts by weight of maleic anhydride in from 500 to 1,000 parts by weight of the solvent in the presence of from 0.5 to 10 parts by weight of the radical generator.

3. Process according to claim 1, wherein the radical generator is selected from the group consisting of benzoyl peroxide, lauroyl peroxide, azobis-isobutyronitrile, dicumyl peroxide, α,α'-bis(t-butylperoxydiisopropyl)-benzene, 2,5-dimethyl-2,5-di(t-butylperoxy)hexane, di-t-butyl peroxide, cumene hydroperoxide, t-butyl hydroperoxide, and mixtures thereof.

4. Process according to claim 1, wherein the solvent is selected from the group consisting of xylene, toluene, tetralin, decalin, heptane, monochlorobenzene, dichlorobenzene, and mixtures thereof.

5. Process according to claim 1, wherein the liquid rubber is a terminal-hydroxylated poly-1,2-butadiene or a terminal-hydroxylated poly-1,4-butadiene.

6. Process according to claim 1, wherein the reaction temperature is from 50° to 150° C. and the reaction time is from 2 to 5 hours.

* * * * *